United States Patent
Schmidt et al.

(10) Patent No.: US 7,694,204 B2
(45) Date of Patent: Apr. 6, 2010

(54) ERROR DETECTION IN PHYSICAL INTERFACES FOR POINT-TO-POINT COMMUNICATIONS BETWEEN INTEGRATED CIRCUITS

(75) Inventors: Brian K. Schmidt, Mountain View, CA (US); Lawrence Llewelyn Butcher, Mountain View, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 1049 days.

(21) Appl. No.: 11/372,866

(22) Filed: Mar. 9, 2006

(65) Prior Publication Data
US 2007/0260965 A1    Nov. 8, 2007

(51) Int. Cl.
*H03M 13/00* (2006.01)
(52) U.S. Cl. .................. 714/758; 714/781; 714/799
(58) Field of Classification Search ........... 714/758, 714/781, 799
See application file for complete search history.

(56) References Cited

U.S. PATENT DOCUMENTS

| | | | |
|---|---|---|---|
| 7,111,220 B1 * | 9/2006 | Sasaki et al. | 714/753 |
| 7,343,540 B2 * | 3/2008 | Khermosh et al. | 714/758 |
| 7,430,261 B2 * | 9/2008 | Forest et al. | 375/364 |
| 7,499,500 B2 * | 3/2009 | Page | 375/295 |
| 2007/0157060 A1 * | 7/2007 | Ganga et al. | 714/752 |

* cited by examiner

*Primary Examiner*—Esaw T Abraham
(74) *Attorney, Agent, or Firm*—Blakely Sokoloff Taylor & Zafman LLP (57) ABSTRACT

An apparatus, system and method for detecting errors in a physical interface during the transmission and/or receipt of data communications between integrated circuits ("ICs") are disclosed. In one embodiment, an apparatus is configured to operate as or within a receiving physical interface. The apparatus includes a decoder configured to decode a subset of encoded data bits to yield decoded data bits. It also includes a physical interface ("PI") error detection bit extractor configured to extract a physical interface error detection bit from the decoded data bits. As such, the apparatus uses the physical interface error detection bit to determine whether the encoded data bits include at least one erroneous data bit as an error. In some embodiments, the apparatus includes an error detector configured to operate within a physical layer. In at least one embodiment, the apparatus efficiently transmits error detection codes within, for example, an NB/(N+1)B line coder.

14 Claims, 9 Drawing Sheets

ERROR DETECTION IN PHYSICAL INTERFACES FOR POINT-TO-POINT COMMUNICATIONS BETWEEN INTEGRATED CIRCUITS

BRIEF DESCRIPTION OF THE INVENTION

This invention relates generally to an apparatus and method for providing reliable data communications between electronic devices, and more particularly, to a physical interface configured to efficiently detect errors at the physical interface during point-to-point transmission of data bits over a physical medium between electronic devices. In one embodiment, the point-to-point transmission of data bits employs low-amplitude, high-frequency signaling along a serial data link.

BACKGROUND OF THE INVENTION

Point-to-point communication between electronic devices, such as integrated circuits ("ICs"), is generally considered to be reliable, especially when a dedicated synchronous clock line is used to synchronize data transfers. In particular, many system designers expect communications between ICs to conform to a prevailing assumption that data bits exchanged between ICs are the same data bits. For example, most conventional processor ICs are designed to act upon data fetched from a memory IC regardless of whether either the address bits transmitted to the memory IC were correctly received, or the data received by the processor IC were the same as sent by the memory IC. But with traditional physical interfaces both transmitting data bits at faster data rates and at decreasing amplitudes (i.e., decreasing transmission power), the effects of background noise on the strength of the data signals causes the signal-to-noise ratios to decrease, which is indicative of an increase in errors that could thwart reliable point-to-point communications. Further, many system designers are implementing physical interfaces that serially transport data over a serial data link using asynchronous clocking techniques, whereby the clock is embedded in encoded serialized data. Examples of high-speed serial communications technologies having serial data links include Serial ATA ("SATA")®, Transition Minimized Differential Signaling ("TMDS"), PCI Express, InfiniBand®, and the like. While conventional physical interfaces that provide for serial data communications reduce both noise and power, at least one drawback is that conventional serial data links are susceptible to data corruption during transit.

In the field of computer networking, the Open Systems Interconnect ("OSI") model describes a common approach to detect and correct errors between two end stations (or computing devices). According to this approach, a data link layer calculates an error-detecting code (e.g., a cyclic redundancy code, "CRC") based on a frame of transmitted bits. Then, it appends the error-detecting code as contiguous bits to the frame and then passes both the error-detecting code and the application data bits to a physical interface for line encoding (or coding). One example of line encoding translates 8 application data bits into 10 encoded bits. This type of line encoding technique is commonly known as 8B/10B. After line encoding is performed, the serial physical interface drives the encoded bits out over a communications medium to another serial physical interface, which recovers the clock and decodes the bits. The data link layer at the receiver then applies error detection and correction techniques using the contiguous bits of error-detecting code.

While functional, the data link layer performs these error detection and correction processes beyond the physical interface, thereby delaying error detection and/or resolution. Also, conventional physical interfaces are generally not well suited to facilitate error detection and correction in a standardized manner. For example, traditional physical interfaces are optimized to provide synchronous and parallel data communications between integrated circuits. As such, they can not readily be adapted to provide timely and reliable data transfers for asynchronous and serial data communications, such as over a serial data link. Further, conventional physical interfaces are not generally conducive to at least provide: (1) transparent error detection and recovery techniques that do not require an application to participate in specialized error handling techniques, and (2) efficient transmissions of error detection codes to increase the rate that those codes are transferred over the serial data link.

In view of the foregoing, it would be desirable to provide a physical interface, an apparatus and a method that minimize the above-mentioned drawbacks and provides for at least error detection and optional error recovery.

SUMMARY OF THE INVENTION

An apparatus, system and method for detecting errors in a physical interface during the transmission and/or receipt of data communications between integrated circuits ("ICs") are disclosed. According to various embodiments of the invention, a physical interface can facilitate communications over either serial or parallel data links, or it can be configured to use either an embedded asynchronous clock or an external synchronous clock.

In one embodiment, an apparatus is configured to operate as or within a receiving physical interface. The apparatus includes a decoder configured to decode a subset of encoded data bits to yield decoded data bits. It also includes a physical interface ("PI") error detection bit extractor configured to extract a physical interface error detection bit from the decoded data bits. As such, the apparatus uses the physical interface error detection bit to determine whether the encoded data bits include at least one erroneous data bit as an error. In some embodiments, the apparatus includes an error detector configured to operate within a physical layer. In at least one embodiment, the apparatus efficiently transmits error detection codes within, for example, an NB/(N+1)B line coder. The encoded data bits can be substantially direct current ("DC")-balanced. Further, the encoded data bits can be configured to shape the spectral properties of emitted radiations. Also, those encoded data bits can also include an embedded asynchronous clock that can be used to recover a clock at a receiving device. In some instances, the apparatus includes an error detector configured to operate within a physical layer to detect errors. The error detector performs error detection earlier than at a data link layer or at any upper layers of the Open Systems Interconnection ("OSI") seven-layer reference model. In some cases, the physical interface error detection bit is a parity bit, while in other instances, the physical interface error detection bit is a portion of an error-detection code. For example, the error-detection code can be a cyclic redundancy check ("CRC") checksum. The error detector in this case is configured to accumulate the physical interface error detection bit as well as other physical interface error detection bits from other subsets of the encoded data bits (i.e., other code words) to reconstruct the error-detection code. Note that the error detector can be configured to generate a CRC checksum from the physical interface error detection bit and the other physical interface error detection bits. Then, the error decoder can compare the CRC checksum against the error-detection code to determine whether an error has occurred.

In various embodiments, the physical interface error detection bit is received at the apparatus concurrent with the subset of the encoded data bits and each of the other physical interface error detection bits are also received at the apparatus concurrent with each of the other subsets of the encoded data bits, thereby decreasing the time the apparatus receives the error-detection code that otherwise is appended to follow the encoded data bits. In at least one embodiment, the apparatus also includes an error corrector configured to correct the error. The error corrector can be configured to either request a retransmission of the subset of the encoded data bits, or signal an application-specific module that an error has been detected so that the application-specific module can resolve the error. Or, the error corrector can take default measures, such as reinitializing one or more ICs. Note that one of the subsets of the encoded data bits can include N+m data bits, which can be decoded to obtain N application data bits as decoded data bits. Also note, that the apparatus can be configured to receive encoded data bits as N+2 data bits and to provide N application data bits as outputs. For example, when N is 8, the apparatus is configured as an 8B/10B decoder, it provides nine decoded data bits: eight application data bits and one physical interface error detection bit for error detection.

In another embodiment of the invention, an apparatus for generating error-detection codes in a physical interface for the transmission of data between integrated circuits ("ICs") is disclosed. In one embodiment, the apparatus is configured to operate as or within a transmitting physical interface. The apparatus can include an N bit-to-N+2 ("N bit/N+2") bit physical layer ("PHY") encoder. This encoder is configured to insert a physical interface error detection bit with N application data bits to form N+1 unencoded data bits, and to encode the N+1 unencoded data bits to yield N+2 encoded data bits. The apparatus also includes an error-detection code generator configured to generate a number of bits constituting an error-detection code, which includes the physical interface error detection bit. N can represent any integer number of data bits. The apparatus, in some cases, can include a serializer configured to serialize the N+2 encoded data bits to form serial N+2 encoded data bits, thereby interleaving single error-detection data bits with the serial N+2 encoded data bits. In at least one embodiment, the apparatus includes storage to store a group of data bits that include the N data bits. The error-detection code generator is configured to examine the group of data bits to generate an error-detection code. In a specific embodiment, the apparatus includes a transmitter ("TX") error corrector configured to retransmit one or more subsets of the group of data bits when the transmitter error corrector receives a request for retransmission.

In yet another embodiment of the invention, a physical interface is formed as an integrated circuit ("IC") on a first substrate to detect transmission errors in data exchanged with a core IC formed on a second substrate. The core IC is another IC that contains logic for implementing an application-specific function, such as a storage function of a memory chip. The physical interface includes a plurality of input ports and output ports, including a first subset of input ports configured to receive in-bound encoded data bits and a first subset of output ports configured to transmit in-bound decoded data bits to the core IC. The physical interface also includes one or more error recovery modules coupled between the plurality of input ports and output ports. At least one of the error recovery modules is coupled between at least one of the first subset of input ports and at least one of the first subset of output ports. The error recovery module optionally can include a physical layer ("PHY") decoder configured to detect errors in the in-bound encoded data bits and to initiate an action to correct the errors.

In still yet another embodiment of the invention, a high-speed serial communications link between at least two integrated circuits ("ICs") is disclosed. This link includes a physical medium for conveying data, a transmitter device coupled to a first end of the physical medium, and a receiver device coupled to a second end of the physical medium. It also includes an error detector configured to determine an error using the physical interface error detection bits. Note that the transmitter device includes an N bit/N+2 bit encoder that generates encoded data bits with physical interface error detection bits encoded therein, and the receiver device includes an N+2 bit/N bit decoder, which decodes the encoded data bits, and an error detector to determine an error using the physical interface error detection bit. Note that the transmitter and receiver devices can be one or more of any of the following: a transition-minimized differential signaling ("TMDS") device, a high-definition multimedia interface ("HDMI") device, a multi-Gigabit Ethernet device (e.g., a 10 Gbps Ethernet, or "10 GbE," device), and/or a serial advanced technology attachment ("SATA") device. Note, too, that the transmitter and receiver devices can implement Digital Visual Interface ("DVI") and/or Low Voltage Differential Signaling ("LVDS"), as well as any other equivalent technologies.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Figure 1A:
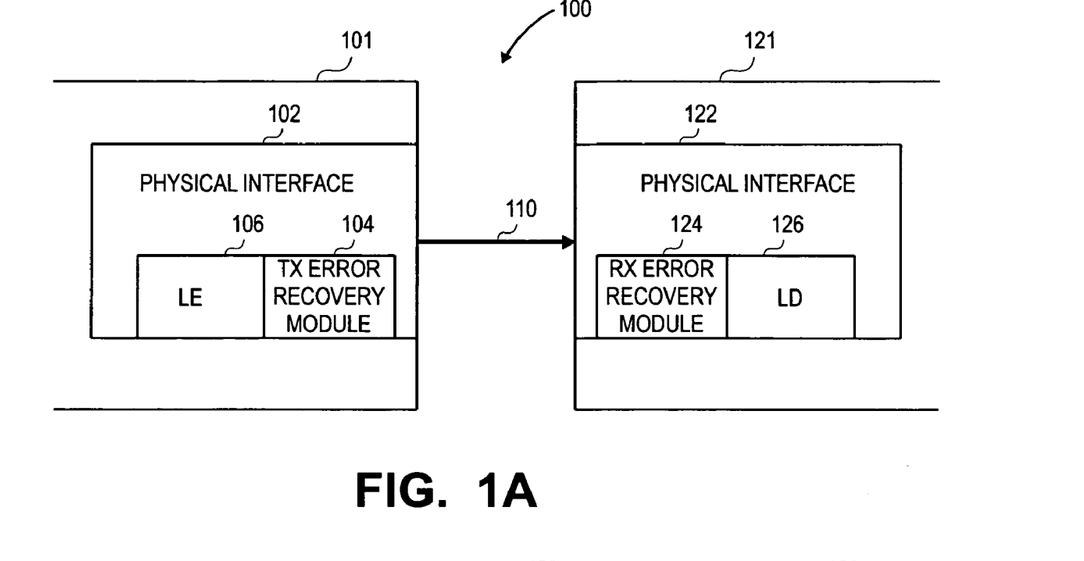
FIG. 1A is a block diagram illustrating physical interfaces that include error recovery modules to detect errors, according to at least one specific embodiment of the invention.

FIG. 1A is a block diagram 100 illustrating physical interfaces that include error recovery modules to detect errors in association with line encoding/decoding, according to at least one specific embodiment of the invention. Physical interfaces 102 and 122 provide for physical connectivity between devices 101 and 121, each of which can be an integrated circuit, such as a memory chip, or an electronic device, such as an Ethernet line card or a networked computer. Physical interfaces 102 and 122 include a line encoder ("LE") 106 and a line decoder ("LD") 126, respectively, to facilitate transmission and receipt of data bits via physical medium 110. In one embodiment, line encoder ("LE") 106 performs line encoding (also referred to as "line coding"), which is the translation of digital information expressed in binary (i.e., data bits) into a specific code (or code word) to optimize transmission of the encoded data bits over a particular type of medium, such as copper wire, optical fiber, radio waves, and the like. Line decoding is the inverse process of translating from the specific code to data bits. Both line encoders and line decoders are tuned to optimally operate with a specific type of medium. As used in some embodiments, the term encoding refers to the translation of data bits into code words as well as the insertion of data bits into or with the code words.

Physical interface 102 also includes a transmitter ("TX") error recovery module 104, whereas physical interface 122 also includes a receiver ("RX") error recovery module 124. Both error recovery modules 104 and 124 operate to detect errors and to optionally correct those errors either in association or in conjunction with line encoding or decoding. While FIG. 1A depicts unidirectional communication, an ordinarily skilled artisan should appreciate that the structures and/or functions of TX error recovery module 104 and RX error recovery module 124 can be combined to form a transceiver ("TX/RX") error recover module (not shown) to support error detection and correction during bi-directional communications via physical medium 110. In at least one embodiment, physical medium 110 provides for a serial data link. Regardless of whether the data link is a serial data link or a parallel data link, line encoder 106 and line decoder 126 implement line encoding/decoding to do one or more of the following: (1) ensure that there are an appropriate number of transitions in the data stream to recover a clock embedded in the data stream, (2) maintain a d-c balance, and (3) provide for spectral shaping of the data link to reduce electromagnetic emissions.

In a specific embodiment, error recovery modules 104 and 124 facilitate early error detection shortly after data bits arrive at a receiver (e.g., an IC or electronic device) such that error detection can be performed, for example, any time before, during or after line decoding. As such, error detection within physical interface 124 can prevent device 121 from performing other downstream processes unnecessarily with incorrect or corrupted data bits until error detection and correction techniques can be applied. Advantageously, error recovery modules 104 and 124 can conserve computational resources that otherwise might process corrupt data bits, and can also expedite communications between devices 101 and 121 by reducing the time required to detect and/or correct errors, according to various embodiments of the invention. Various features of the invention can also decrease the time to detect an error. For example, error detection bits can be transported in an interleaved fashion with application data bits rather than at an end of a group of data bits being transmitted, as is customary. In at least one embodiment, line encoder 106 uses a NB/(N+2)B line encoding for encoding a data stream for a serial data link. Further, line encoder 106 can operate to embed physical interface ("PI") error correction bits in that the encoded data stream without affecting the rate at which application data bits are communicated over physical medium 110. Advantageously, physical interfaces 102 and 122 can implement low-level error detection and/or correction—in whole or in part—at the physical layer (or "PHY") without requiring devices 101 and 121 to resolve errors. As such, PI error correction information can be transmitted along with the application data bits so as to be transparent to the operation of devices 101 and 121. Of course, error detection and/or correction for devices 101 and 121 can be supplemented by other error recovery techniques at circuits and/or layers beyond physical interfaces 102 and 122. As such, the application data bits can include upper-layer ("UL") error detection bits for upper-layer error recovery mechanisms. As error detection and/or correction are performed at physical layers, error detection can advantageously be performed more quickly than if performed beyond physical interfaces 102 and 122.

Figure 1B:
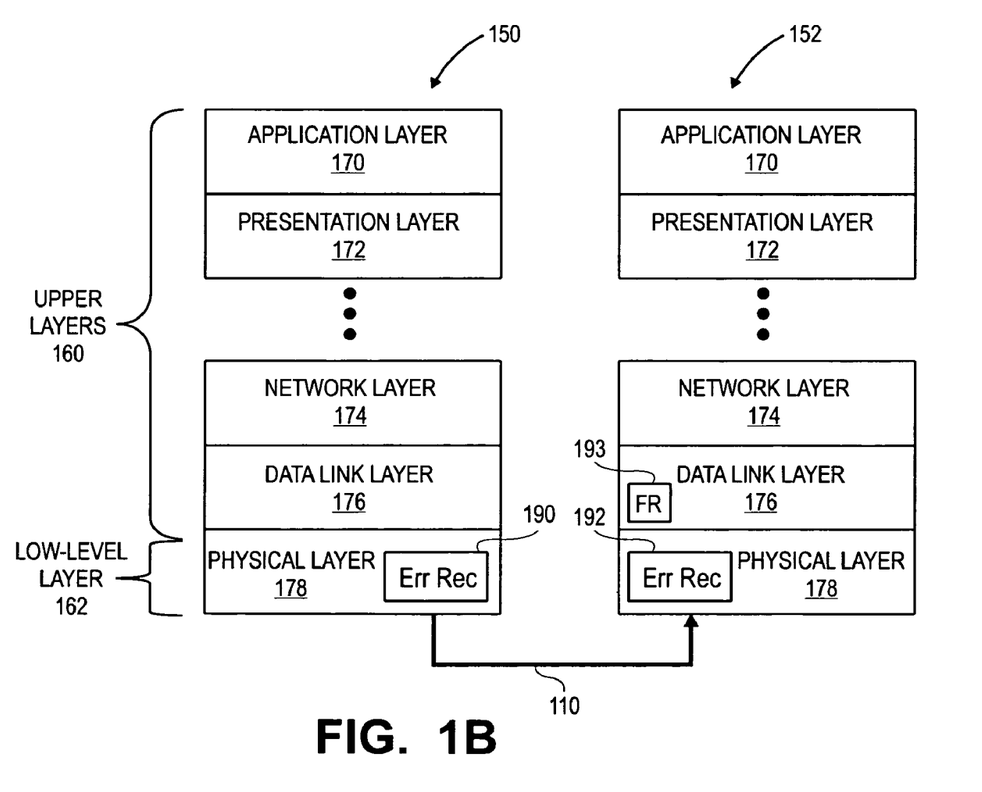
FIG. 1B illustrates error recovery modules and implemented to provide error detection at a physical layer rather than at a data link layer, according to one or more embodiments of the invention.

FIG. 1B illustrates error recovery modules 104 and 124 of FIG. 1A implemented to provide error detection at a physical layer rather than at a data link layer, according to one or more embodiments of the invention. The International Standard Organization's ("ISO's") Open System Interconnection Reference Model ("OSI Model") describes the functionality of: a physical layer (e.g., as a low-level layer 162) and other upper layers 160, which include a data link layer 176. FIG. 1B shows an OSI model 150 for device 101 and an OSI model 152 for device 121. In particular, each of OSI models 150 and 152 includes one or more of an application layer 170, a presentation layer 172, a network layer 174, a data link layer 176, and a physical layer 178, all of which have functionalities that are well known and thus need not be discussed here in detail. In accordance with the OSI Model 150, data link layer 176 of a transmitting IC or device 101 (i.e., a "transmitter") generally generates upper-level error detection codes prior to encoding by a line encoder in low-level layer 162, whereas data link layer 176 of a receiving IC or device 121 (i.e., a "receiver") normally detects and corrects errors after the line decoder in low-level layer 162 decodes the line-encoded bits. In particular, the receiving data link layer 176 usually assembles a bit stream of the decoded data bits into frames and then computes an upper-level error detection code, such as a CRC check sum, based on the contents of the frame. In one example, a framer ("FR") 193 assembles contiguous sets of bits into a frame. In particular, framer 193 establishes a Frame Check Sequence ("FCS") code in one of the fields of the frame. The FCS is used to detect errors using, for example, a Cyclic Redundancy Check ("CRC") checksum. The FCS is usually compared against the CRC checksum to determine whether an error exists. To illustrate, consider that an Ethernet frame includes header bits and up to 1500 bytes of payload, with a CRC checksum appended as 32 contiguous bits to the end of the payload. Generally, the CRC checksum is appended in one or more upper layers 160 above physical layers 178. As shown, physical layers 178 include low-level error recovery functions ("Err Rec") 190 and 192 for enabling low-level layer 162—at least in some embodiments—to entirely perform low-level error detection and/or correction ("error recovery") regardless of any upper-level error recovery mechanisms employed in upper layers 160. In at least one embodiment, low-level error recovery functions ("Err Rec") 190 and 192 operate prior or while application data bits are temporarily stored in a buffer (e.g., a FIFO buffer) for determining, in whole or in part, whether an error occurred. If no error exists, the application data bits are released to an upper layer for assemblage into subsets of bits. The subset of bits can represent an Ethernet frame, an address for a memory device, and the like. In a specific embodiment, the demarcation between physical layer 178 and data link layer 176 is a point at which the application data bits exit the buffer to an upper layer for assemblage.

Regardless of which layer implements conventional error detection and correction, traditional upper-level error detection codes are generally transmitted in a fashion similar to the payload. But according to various embodiments of the invention, low-level error detection codes and payload can be line-decoded differently, such as in parallel. As used herein, the term payload generally refers to a collection of bits (i.e., application data bits) that represent program instructions and/or program data used by an application layer. Application data bits constitute application data, and therefore do not contain control codes for controlling data bit transfer. By contrast, error detection codes are control codes as they are used to control the reliability of data bit transmissions. So according to the various embodiments, portions of both application data bits and error detection bits are line-decoded (and line-encoded) at or nearly at the same time (especially if the portions of both application data bits and error detection bits are together encoded to form a code word). In one embodiment, line decoders operate to translate a code word to form decoded data bits, which can include both application data bits and physical interface ("PI") error detection bits. Note that traditional upper-level error detection codes are transmitted in groups of contiguous bits (e.g., the bits of a CRC checksum for an Ethernet frame) and are usually passed through line decoders to upper-layers in a manner similar to application data bits. Consequently, conventional upper-level error detection techniques generally expend computational resources to line-decode control codes for error recovery at upper-layers, whereas in accordance with at least a specific embodiment of the invention, low-level error detection codes need not be communicated anywhere other than to the physical layer.

Figure 2A:
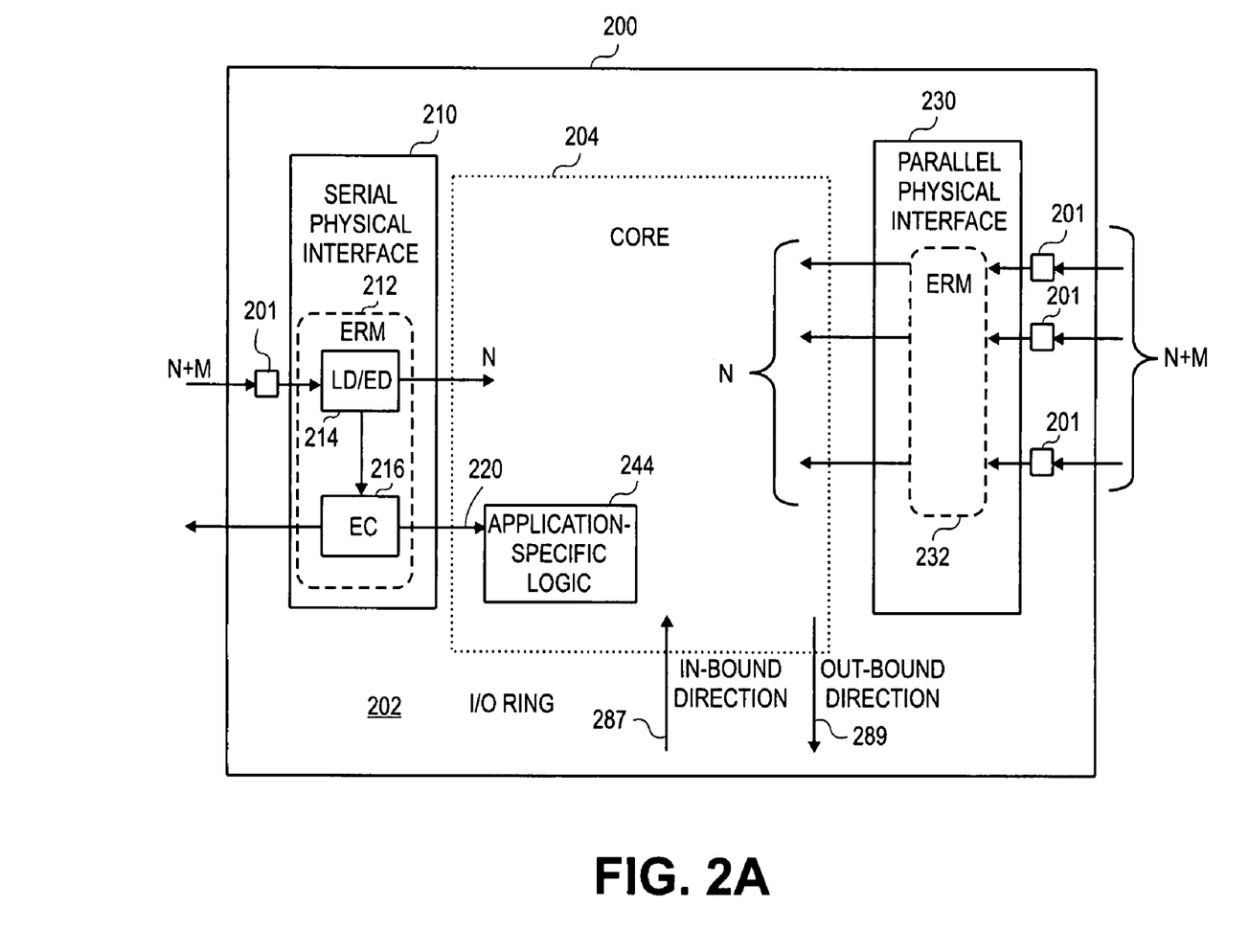
FIG. 2A is a block diagram of a circuit implementing error recovery modules to provide reliable data transfers at physical interfaces that use embedded clocks and clock recovery, according to one embodiment of the invention.

FIG. 2A is a block diagram of a circuit implementing error recovery modules to provide reliable data transfers at physical interfaces that use embedded clocks and clock recovery, according to one embodiment of the invention. In the example shown, an electronic device 200 includes physical interfaces 210 and 230 that are composed of an RX error recovery module ("ERM") 212 and RX error recovery module ("ERM") 232, respectively. Note that while FIG. 2A omits physical interfaces that include TX error recovery modules, an ordinarily skilled artisan should appreciate that such TX error recovery modules can also be implemented, but with inverse functionality. In some cases, physical interfaces 210 and 230 are formed as circuits within, for example, an input/output ("I/O") ring 202. I/O ring 202 includes input and output terminals 201 for coupling conductors, such as bonding wires, to an external source of signals (not shown), such as an integrated circuit transmitting signals to a core circuit 204. RX error recovery module 212 and RX error recovery module 232 each are coupled to a core circuit 204 to deliver signals thereto. As used in some embodiments, the term core circuit refers to any kind of circuit that performs one or more core functions and can be configured to receive inputs or transmits output via physical interfaces 210 and 230. In some embodiments, core circuit 204 can be formed from an intellectual property ("IP") core, which can be expressed in a Hardware Description Language ("HDL") code (e.g., VHDL or Verilog) or as a netlist file. Accordingly, core circuit 204 is portable and can be easily inserted into most designs benefiting from low-level layer error detection and correction provided by physical interfaces 210 and 230. As an example, consider that core circuit 204 is any circuit, such as a dynamic random access memory ("DRAM"), a microcontroller or processor circuit, or any type of circuit that would benefit from implementations of error detection and corrections at physical interfaces. Advantageously, low-level error detection and corrections operates in a manner that is transparent to core circuit 204 (i.e., physical interface error recovery need not require resources of core circuit 204 to perform error detection and/or correction).

Physical interface 210 is a serial physical interface configured to serially receive N+m encoded bits into a line decoder-error detector ("LD/ED") 214, which is configured to decode some or all of the N+m encoded bits to form N decoded application data bits. The value "m" represents the difference in the number of bits from the number of encoded data bits and the number of application data bits. For example, an 8B/10B line encoder has an m of 2, which is the difference. Line decoder-error detector 214 operates to line decode encoded bits and then detect an error, if one is detectable. If line decoder-error detector 214 detects an error, then it instructs an error corrector ("EC") 216 to take appropriate error recovery measures. In one embodiment, error corrector 218 is configured to transmit an error indication signal 218 to an external IC or device to alert the external IC or device so it can resolve the error, such as by retransmitting the N+m encoded bits to physical interface 210. Advantageously, physical interfaces 210 and 230 provide error detection and correction for core circuit 204 without modifying core circuit 204, thereby conserving engineering resources required to integrate either error detection or correction into core 204. In another embodiment, error corrector 218 is configured to transmit an error indication signal 220 into core circuit 204 so that it can correct the error. In this case, core circuit 204 includes application-specific logic 244 to correct any detected errors. Advantageously, error handling by application-specific logic 244 in core circuit 204 (or elsewhere) therefore enables error detection and correction without requiring the transmitting IC or device (not shown) to help correct the error. This minimizes the number of signal conductors and/or pins needed by electronic device 200, especially if it is encapsulated in a semiconductor package. In still yet another embodiment, error corrector 216 of physical interface 210 can correct errors without sending either error indication signals 218 or 220. For example, the error corrector can implement forward error correction techniques, which automatically corrects errors.

Next, consider that the external IC, for example, is a DRAM controller (not shown) and core circuit 204 is a DRAM memory. Then, physical interface 230 can provide a chip-to-chip interface to exchange error-corrected addresses and data between the DRAM controller and the DRAM memory (i.e., core circuit 204) without one or more of them being modified (functionally or structurally) to implement error detection and correction. In some embodiments, physical interfaces 210 and 230 are formed on a first substrate, which contains an input-output ("I/O") ring 202. Core circuit 204 is formed on a second substrate. If the first and second substrates are separate, then physical interfaces 210 and 230 can be packaged separately from core circuit 204. But if they are formed on the same substrate, then they can be formed as part of a system-on-chip ("SOC") and can be encapsulated together by a single package. In alternative embodiments, physical interface 230 is a parallel physical interface configured to receive N+m encoded bits into RX error recovery module 232 and then decode some or all of the N+m encoded bits to form N decoded application data bits. FIG. 2A omits the details of line decoder-error detector and error corrector for RX error recovery module 232 to simplify the discussion. Note that while FIG. 2A depicts physical interfaces 210 and 230 providing in-bound data bits (i.e., in-bound toward core 204) in an in-bound direction 287, those same physical interfaces can provide for out-bound data bit transmissions (not shown) from core 204 in an out-bound direction 289. Note that both serial physical interface 210 and parallel physical interface 230 shown in FIG. 2A are configured to line decode in-bound data bits to, among other things, recover embedded clocks therein. In other embodiments either serial physical interface 210 or parallel physical interface 230, or both, can be configured to receive an external clock rather than an embedded clock.

Figure 2B:
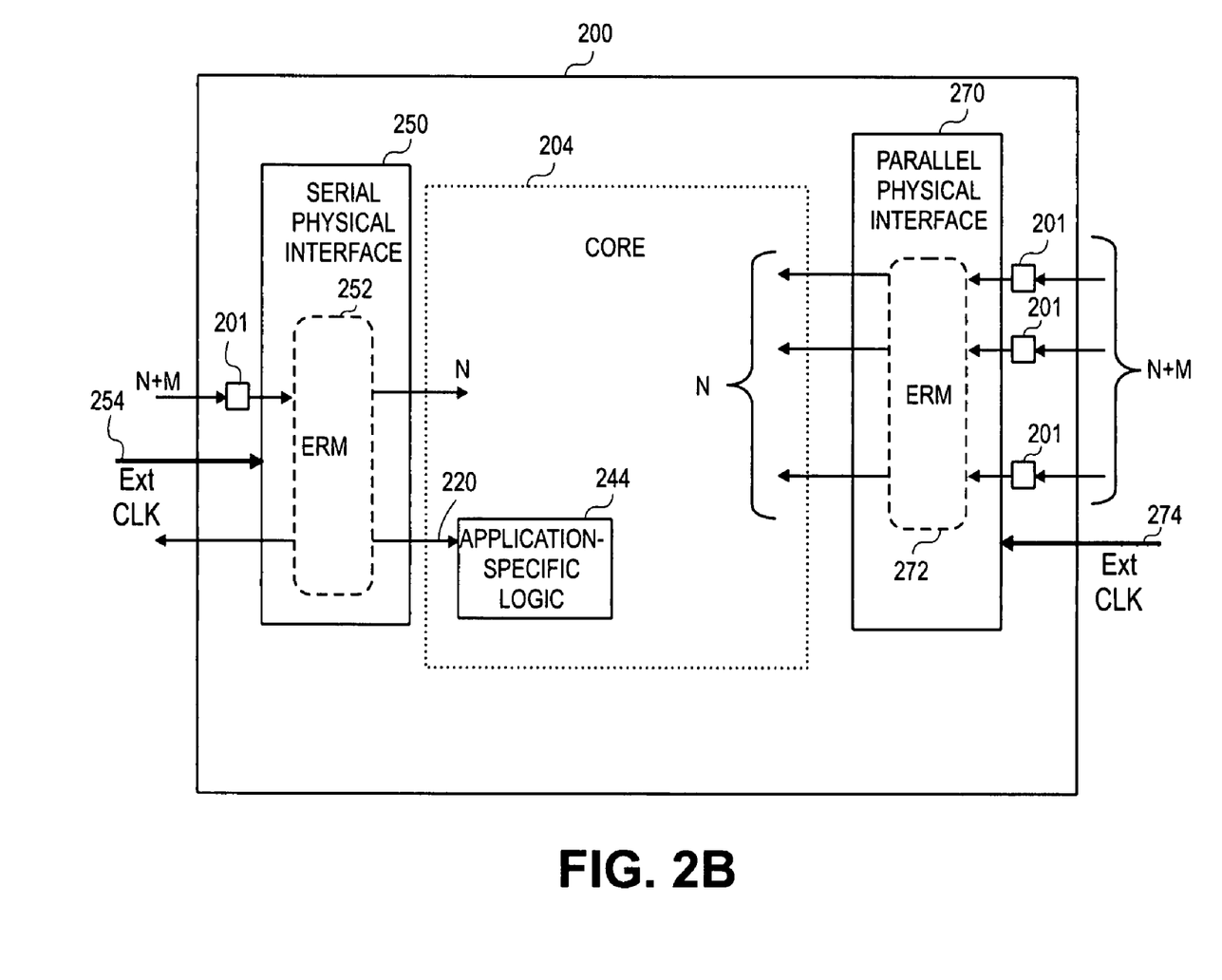
FIG. 2B is another block diagram of the circuit of FIG. 2A implementing error recovery modules to provide reliable data transfers at physical interfaces that use external clocks, according to one embodiment of the invention.

FIG. 2B is another block diagram of the circuit of FIG. 2A implementing error recovery modules to provide reliable data transfers at physical interfaces that use external clocks, according to one embodiment of the invention. Unlike serial physical interface 210 or parallel physical interface 230 in FIG. 2A, electronic device 200 of FIG. 2B includes a serial physical interface 250 configured to receive an external clock ("Ext. CLK") 274. Electronic device 200 also includes a parallel physical interface 270 configured to receive an external clock ("Ext. CLK") 254. Since both physical interfaces 250 and 270 can receive external clock signals, these interfaces need not include clock recovery circuits since embedded clocking techniques need not be employed. As such, error recovery modules 252 and 272 need not be disposed after a line decoder or a line decoding process. Note that elements in FIG. 2B each can have an equivalent functionality and/or structure as elements similarly-numbered in FIG. 2A.

Figure 3:
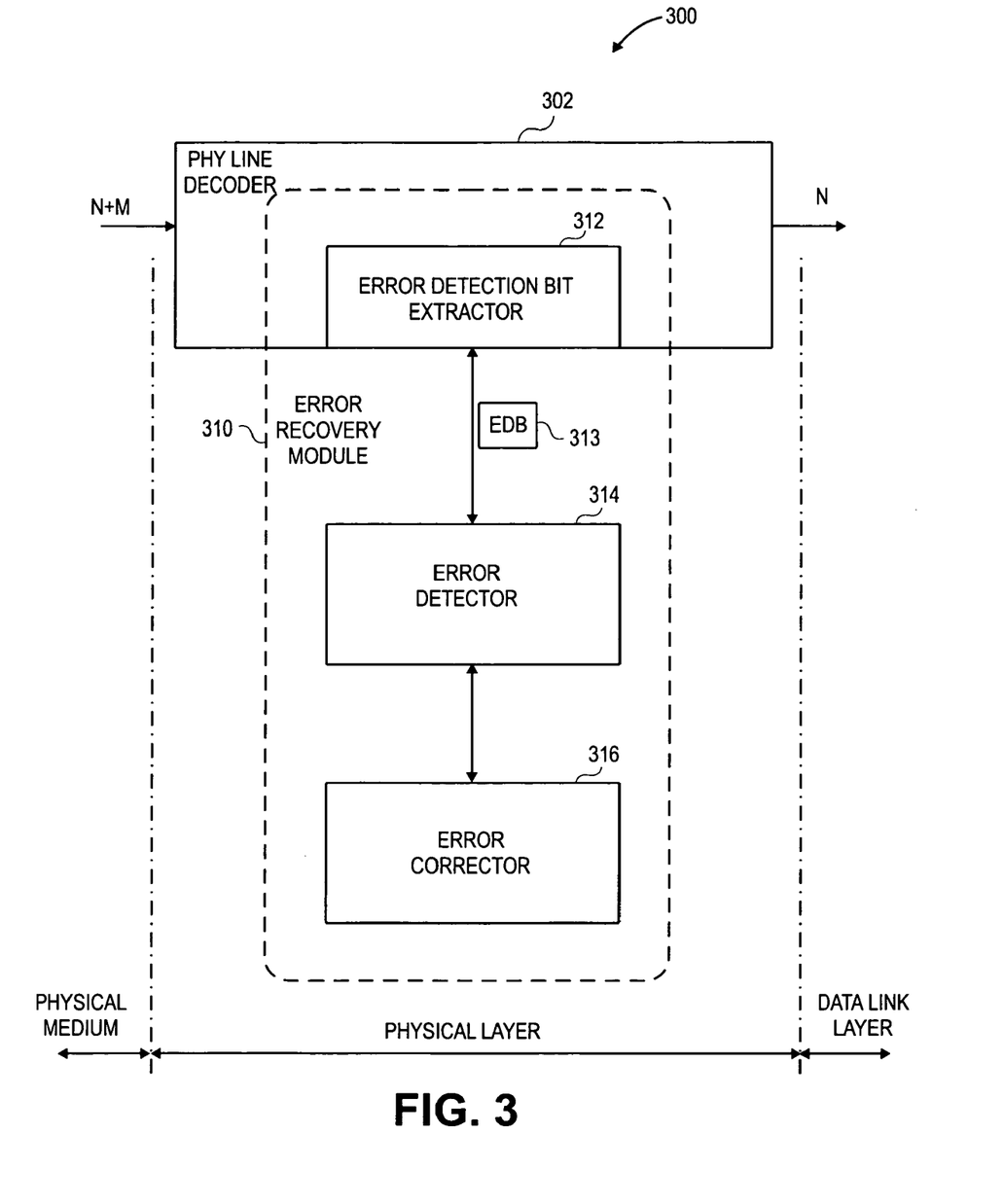
FIG. 3 is a block diagram showing a physical interface configured to detect and optionally correct errors, according to a specific embodiment of the invention.

FIG. 3 is a block diagram showing a physical interface configured to detect and optionally correct errors, according to a specific embodiment of the invention. A physical interface 300 includes a physical layer ("PHY") line decoder 302 and an error recovery module 310, which is composed of an error detection bit extractor 312, an error detector 314 and an error corrector 316. Error detection bit extractor 312 is at least functionally cooperative with the line decoding process of PHY line decoder 302 and, as such, it is shown in FIG. 3 to reside within PHY line decoder 302. In this example, PHY line decoder 302 is at least configured to receive N+m encoded bits (i.e., symbols or code words) of a bit stream and to decode all or some of those bits to form N decoded application data bits. For example, PHY line decoder 302 can operate to receive 10, 14, 20, 66, or 130 encoded application data bits (or "N+2" bits), and then can respectively decode those bits to form 8, 12, 18, 64 or 128 decoded application data bits (or "N" bits). The two bits are traditionally used for at least clock recovery and DC-balancing. In various embodiments, PHY line decoder 302 can operate to receive any number of encoded data bits and then decode those bits into any other number of application data bits. For example, PHY line decoder 302 can decode 80 bits of encoded data to form 64 decoded application data bits.

In a specific embodiment, PHY line decoder 302 decodes the N+m−1 encoded bits, which is a subset of the N+m bits, to yield N decoded application data bits and E error detection bits. Then, error detection bit extractor 312 extracts one or more physical interface error detection bits for low-level error detection purposes. For example, error detection bit extractor 312 can extract a single bit from the quantity of N+m (e.g., 10 bits) to yield N+m−1 bits (e.g., 9 bits) decoded bits, which include N decoded application data bits and E decoded error detection bits. As such, PHY line decoder 302 is configured to receive N+m bits, and to perform line decoding, which yields N application data bits and at least one error detection bit. Advantageously, PHY line decoder 302 can be implemented to supplement or replace a conventional 10B/8B decoder, which uses a commonly-used symbol size of 10 bits for the encoded bits, with the decoded application data bits having a bit size of 8 bits. In various embodiments of the invention, PHY line decoder 302 examines a $9^{th}$ bit (i.e., one of the two bits of the difference between 10 encoded and 8 decoded application data bits) to detect errors. A suitable PHY line decoder 302 is an N+1 bit/N bit decoder as described in U.S. Pat. No. 6,747,580 titled "Method and Apparatus for Encoding or Decoding Data in accordance with an NB/(N+1)B Block Code and Method for Determining such a Block Code," which is incorporated by reference in its entirety for all purposes. Note that while FIG. 3 depicts a PHY line decoder 302, one having ordinary skill in the art should appreciate that a PHY line encoder that encodes N application data bits and E error detection bits into N+m encoded bits (i.e., an N bit/N+m bit encoder) can be constructed to operate in an inverse manner described in FIG. 3 and elsewhere herein.

After extraction, error detection bit extractor 312 then sends the physical interface ("PI") error detection bit ("EDB") 313 to error detector 314, which uses that bit to determine whether the N+m encoded data bits include one or more erroneous data bits. Error detector 314 is configured to detect errors in accordance with any number of error detection techniques and codes. In one embodiment, error detector 314 is configured as either an even or odd parity checker, with the physical interface error detection bit being a parity bit (i.e., either an even or odd parity bit). Advantageously, the physical interface error detection bits are received at PHY line decoder 302 concurrent with subsets of application data bits that undergo decoding. This can decrease the amount of time required for PHY line decoder 302 to receive the error-detection code in comparison to conventional error detection techniques that append an error detection code to the end of a group of encoded data bits, where the group can have a bit size much greater than N+m bits. In another embodiment, the physical interface error detection bit is a portion (e.g., one bit) of a CRC checksum. In this case, an error-detection code generator in a transmitting physical interface (not shown) is configured to generate the physical interface error detection bit as part of a CRC checksum. As is discussed below in FIG. 6, an error-detection code generator (or equivalent) can provide the bits of the CRC checksum to a PHY line encoder (not shown), which inserts the physical interface error detection bit with N unencoded application data bits to yield N+2 encoded data bits. Consequently, error detector 314 operates to accumulate or collect physical interface error detection bits from each subset of decoded N+m data bits to reconstruct the CRC checksum as an error-detection code. For example, consider that for each set of 10 encoded bits being decoded by PHY line decoder 302, one bit of a CRC checksum is provided as a physical interface error detection bit for each set of 8 decoded application data bits. If a 16-bit CRC checksum is implemented, then for every 16 sets of 8 decoded application data bits (i.e., for every 128 bits) error detector 314 CRC can reconstruct the 16-bit CRC checksum. Then, error detector 314 generates a CRC checksum from those 128 bits and then compares that CRC checksum against the reconstructed error-detection code to determine whether an error has occurred. Error detector 314 can implement other error detection techniques, such as forward error correction. Examples of forward error correction techniques include Reed-Solomon codes, Hamming codes, and Bose-Chaudhuri-Hocquenghem ("BCH") codes.

Once error detector 314 determines that an error has occurred during data bit transmission, then it signals to error corrector 316 that such an error has occurred. In some cases, error corrector 316 operates to request a retransmission of the decoded application data bits for which an error has been detected. Continuing with the previous example, if the 16-bit CRC checksum comparison indicates that an error exists in the 128 decoded application data bits, then error corrector 316 can request that the transmitting physical interface resend those 128 bits. In other cases, error corrector 316 can activate an application-specific circuit to perform user-defined error handling. In at least one instance, error corrector 316 can take some sort of default error-correcting action, such as reinitializing an associated IC, like a core circuit described above.

Figure 4:
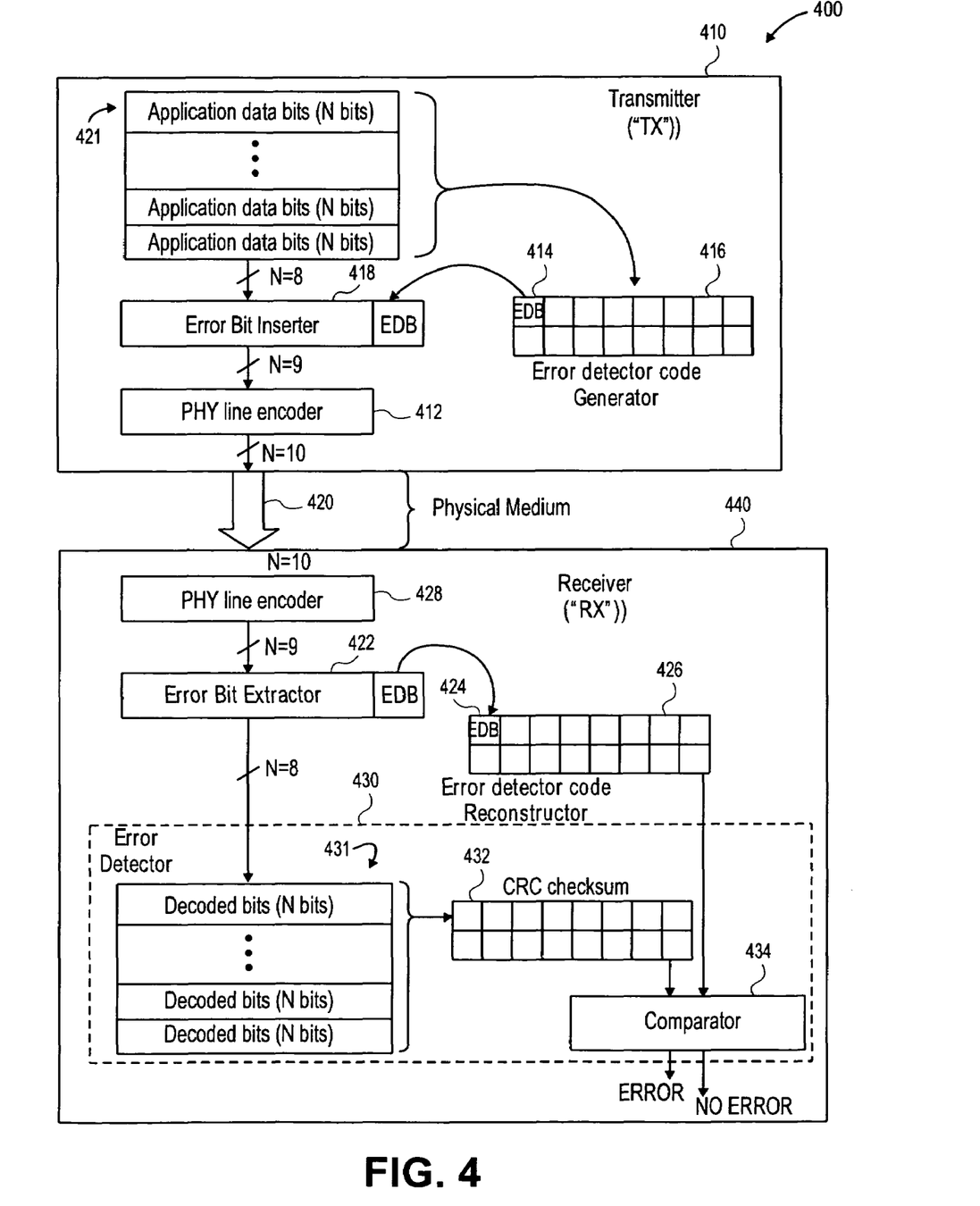
FIG. 4 is a functional block diagram illustrating line encoding and line decoding with error-detection bit insertion and extraction, according to one embodiment of the invention.

FIG. 4 is a functional block diagram illustrating line encoding in a transmitter and line decoding in a receiver with error-detection bit insertion and extraction, according to one embodiment of the invention. As shown in diagram 400, transmitter physical interface ("TX") 410 includes a PHY line encoder 412, an error detection code generator 416, an error bit inserter 418 and an optional buffer 421 for maintaining application data bits during generation of error detection codes, for example. In this example, error detection code generator 416 generates an error detection code based on application data bits in buffer 421, such as a 16-bit CRC checksum. Next, an error bit inserter 418 selects at least one error-detection bit ("EDB") 414 from the 16-bit CRC checksum and then inserts it with an out-going set of N application data bits from buffer 421 to form 9 bits. Then, PHY line encoder 412 encodes the 9 bits into 10 encoded bits (or symbols). In some embodiments, PHY line encoder 412 encodes error-detection bit 414 in a manner that embeds an asynchronous clock in the 10 encoded bits as well as maintaining a zero DC offset and/or optimal spectral characteristics for those same encoded bits. In a specific embodiment, PHY line encoder 412 operates in accordance with coding techniques set forth in U.S. Pat. No. 6,747,580 whereby PHY line encoder 412 encodes the N bits of application data into N+1 encoded bits. For example, consider N is the number 9. As such, PHY line encoder 412 can encode 8 application data bits and 1 error bit (i.e., 9 bits) into 10 encoded bits without affecting the data rate associated with 8B/10B coding schemes. Note that in FIG. 4, N can represent any non-negative integer.

Transmitter physical interface 410 then sends the encoded bits via physical medium 420 to error bit extractor 422 of a receiving physical interface ("RX") 440. Receiving physical interface ("RX") 440 includes a PHY line decoder 428, an error bit extractor 422, error detection code reconstructor 426, an error detector 430, a comparator 434, and a buffer 431, which can maintain the decoded application data bits pending confirmation that no errors are detected. PHY line decoder 428 decodes the 10 encoded data bits into 9 decoded bits, which includes 8 decoded application data bits and 1 decoded error detection bit ("EDB") 424. In various embodiments, PHY line decoder 428 includes clock data recovery circuits (not shown) to recover the embedded clock transmitted over physical medium 420 with the encoded application data bits. Error bit extractor 422 extracts error-detection bit 424 from the 9 decoded bits and provide it to error detection code reconstructor 426, which accumulates the error detection bit with other physical interface error detection bits. Next, error detection code reconstructor 426 reconstructs the error detection code, which was originally generated by error detection code generator 416. Next, error detector 430 generates a CRC checksum 432 based on a group of N decoded application data bits in buffer 431. Then, comparator 434 can operate to compare whether CRC checksum 432 matches error detection code 426. If it does, then there is no error; if it does not, then there is an error.

Figure 5:
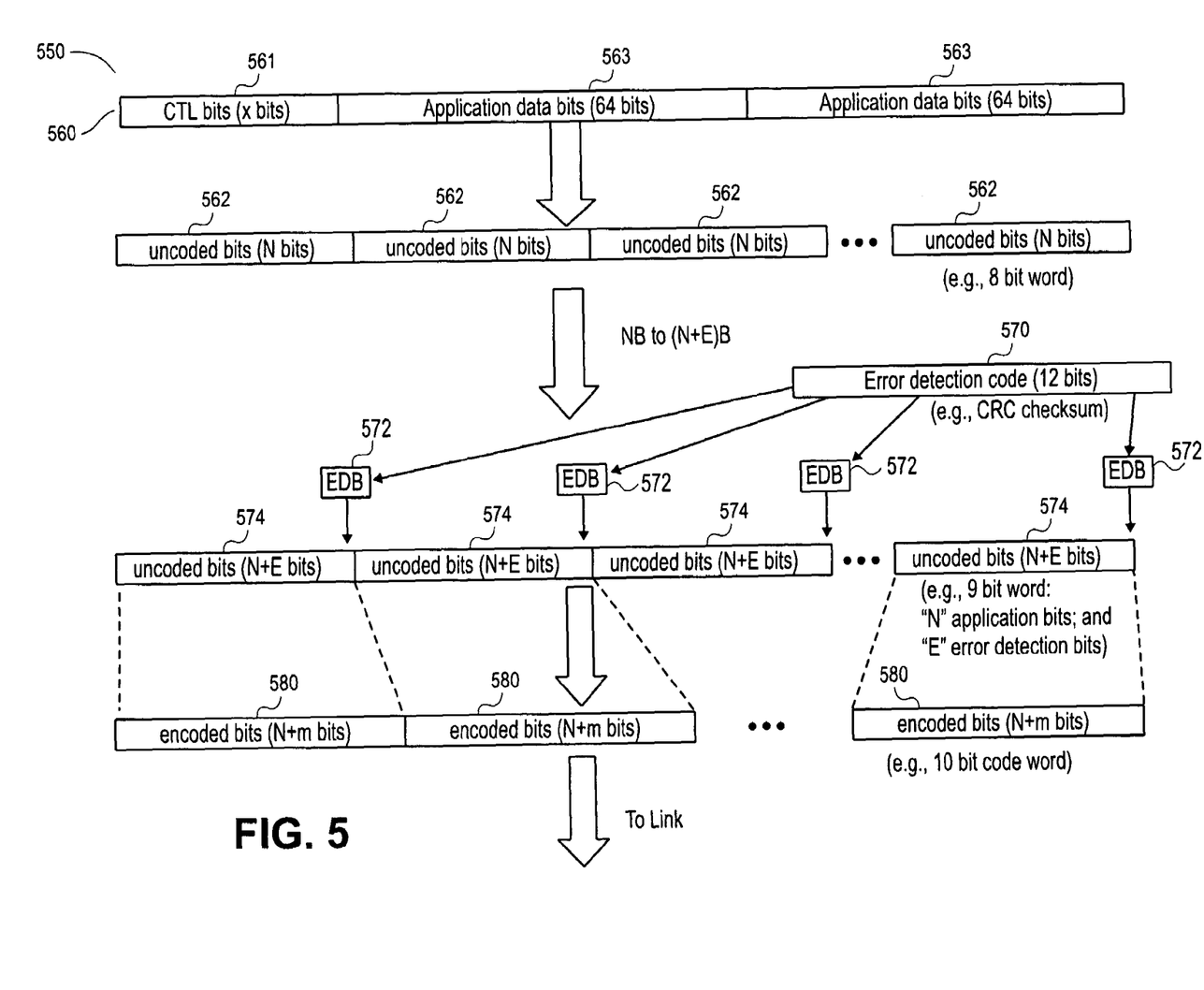
FIG. 5 depicts an exemplary flow for line encoding a group of data bits as a cell in accordance with one embodiment of the invention.

FIG. 5 depicts one example of a flow for line encoding a group of data bits as a cell in accordance with one embodiment of the invention. In some implementations, a transmitting physical interface can transmit data as shown in flow 550, whereby groups 560 of data bits can be referred to as a cell (as well as a frame or the like). Cell 560, for example, can include any number of control bits 561 (e.g., x number of bits) and two application data words 563 of 64 bits each. An upper-layer device (not shown), which resides above a PHY line encoder in the physical layer, can be configured to break cell 560 into discrete sets 562 of uncoded (i.e., precoded or unencoded) bits for use by a PHY line encoder. Each set 562 has N bits (e.g., 8 bits). An error detection code generator (not shown) generates an error detection code 570 based on cell 560 to form an error detection code as a 12-bit CRC, for example. The PHY line encoder then can insert a physical interface error detection bit ("EDB") 572 into the uncoded bit stream in or near sets 562 to form sets 574 of N+E bits (e.g., N can be 8 bits and E can be 1 bit). The PHY line encoder then can translate each set 572 of N+E bits into 10-bit code words 580 (e.g., encoded data bits) for transmission over a data link, such as a serial data link. Although not shown, a PHY line decoder at a receiving physical interface would operate in a similar, but inverse manner.

Figure 6:
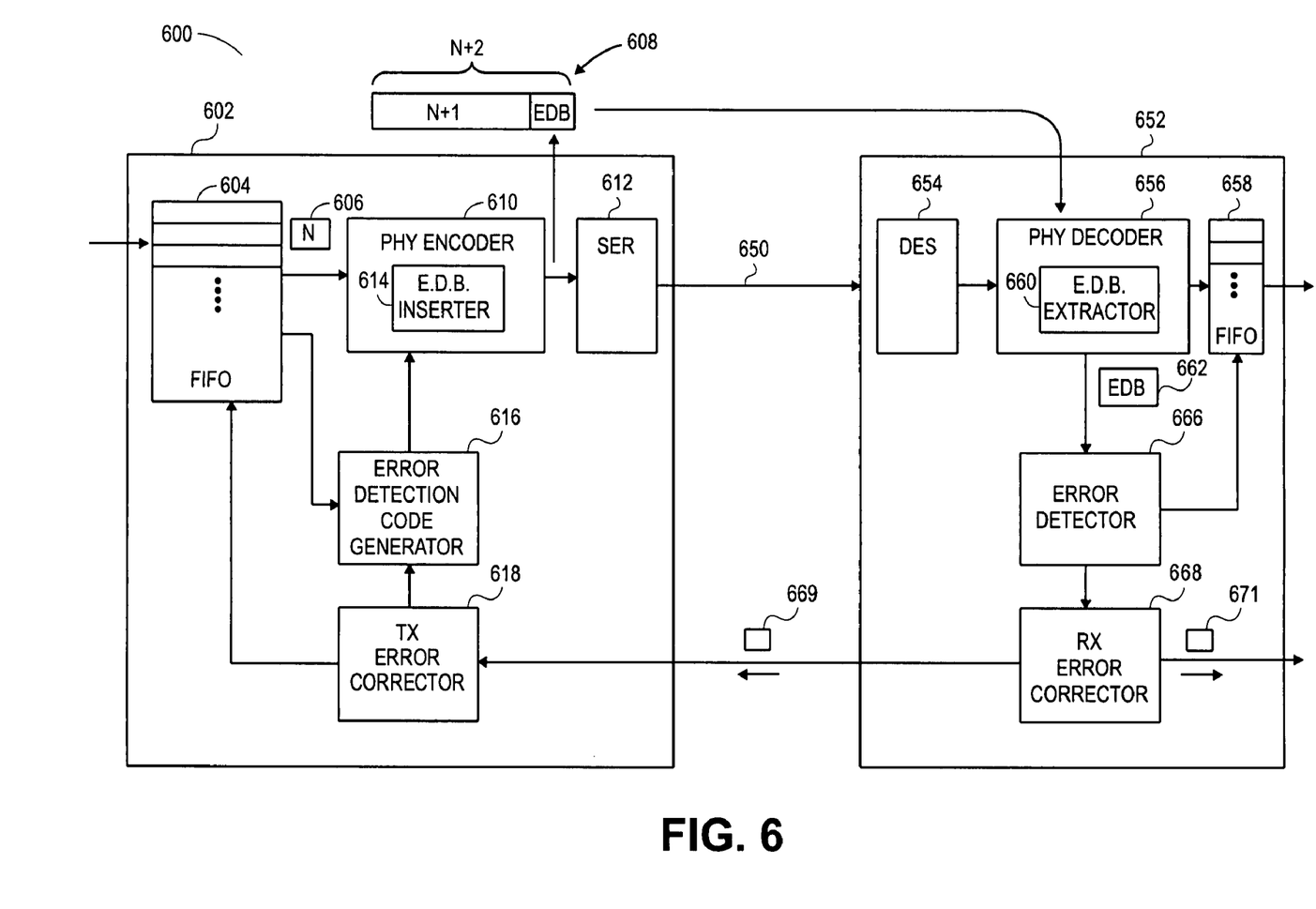
FIG. 6 is a block diagram illustrating physical interfaces that provides for error detection and correction by at least retransmitting data bits, according to at least one specific embodiment of the invention.

FIG. 6 is a block diagram 600 illustrating physical interfaces that provide for error detection and correction by at least retransmitting data bits, according to at least one specific embodiment of the invention. Physical interfaces 602 and 652 provide for physical connectivity through a high-speed serial communications link 650. Physical interface 602 includes storage, such as a first in, first out buffer ("FIFO") 604, for storing data bits that are to be transmitted. FIFO 604 maintains the stored data bits to compute, for example, an error detection code over a group of data bits. In some cases, FIFO 604 stores data bits for retransmission if an error occurs. Physical interface 602 also includes PHY line encoder ("PHY encoder") 610, a serializer ("SER") 612 for serializing parallel data bits, an error-detection code generator 616 and a transmitter ("TX") error corrector 618. Based on the contents of the group of data bits in FIFO 604 at a specific time, error detection code generator 616 generates an error detection code, such as a CRC checksum. Error detection bit inserter 614 decomposes the CRC checksum and inserts at least one bit (e.g., one E bit) as a physical interface error detection bit ("EDB") with the N unencoded bits 606. In operation, PHY line encoder 610 encodes N+E bits to form N+2 encoded data bits 608. Serializer 612 then serializes N+2 data bits 608 prior to transmission over link 650. Receiving physical interface 652 includes a deserializer 654 to convert N+2 data bits 608 to parallel data bits. PHY line decoder ("PHY decoder") 656 decodes the encoded bits stream and stores the decoded data bits in FIFO 658. Error detection bit ("EDB") extractor 660 extracts at least one bit as physical interface error detection bit ("EDB") 662 and sends it to error detector 666. When error code reconstruction is complete, error detector 666 operates to determine whether an error has occurred. If error detector 666 detects no errors, then it instructs FIFO 658 to release the decoded data bits for further processing. But if error detector 666 detects an error, then it indicates the presence of an error to a receiver ("RX") error corrector 668. In one instance, RX error corrector 668 sends a request 669 to instruct TX error corrector 618 to retransmit the contents, or a portion thereof, via link 650. In another instance, RX error corrector 668 can send a request 671 to an application-specific circuit (not shown) to handle the error. In yet another instance, receiver error corrector 668 can correct the error using forward error correction techniques or the like.

Figure 7:
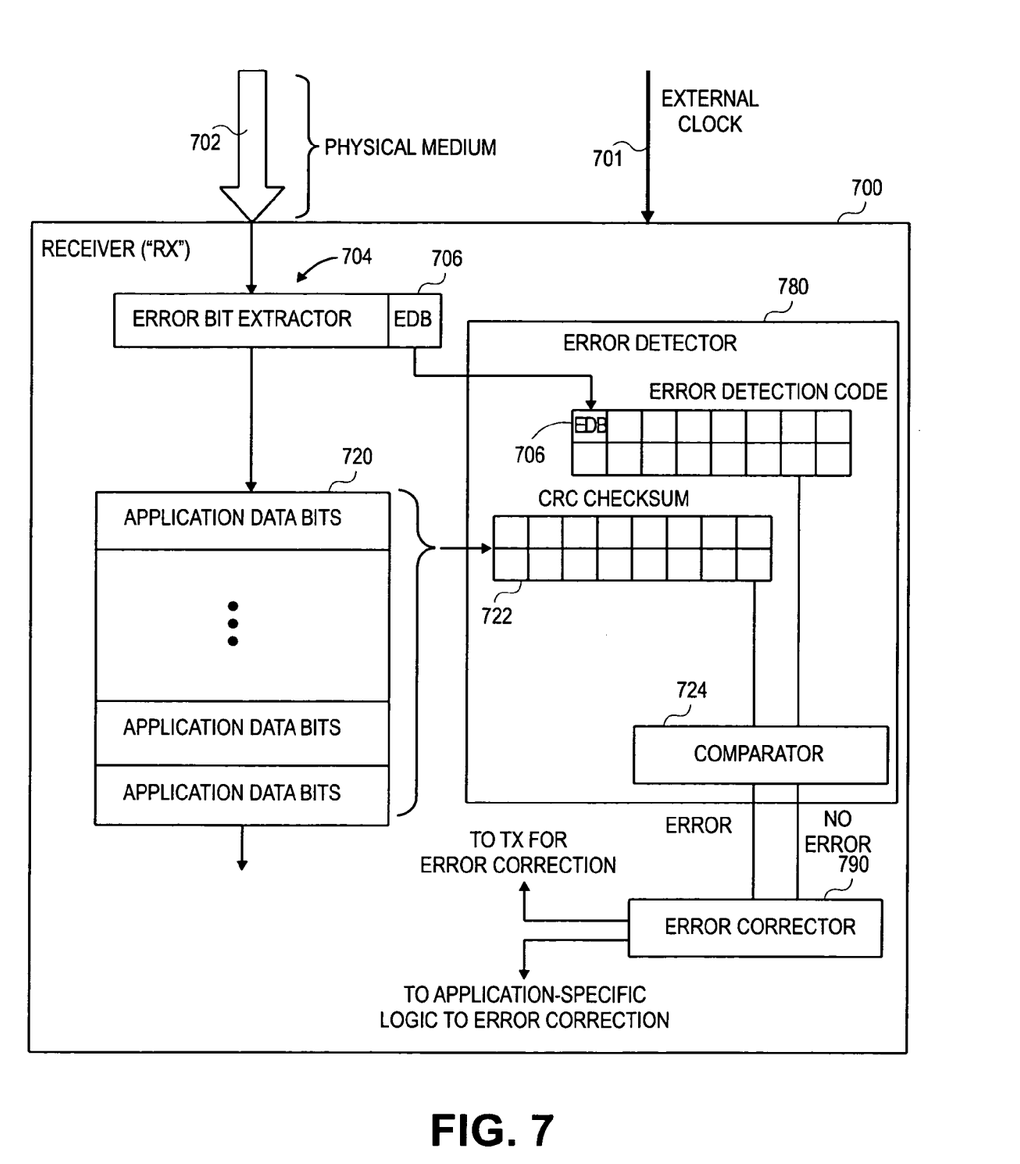
FIG. 7 illustrates an alternative receiver for implementing error detection and correction without line decoding, according to at least one specific embodiment of the invention.

FIG. 7 illustrates an alternative receiver for implementing error detection and correction without line decoding, according to at least one specific embodiment of the invention. In receiver ("RX") 700, a transmitting physical interface (not shown) sends data bits via link 702. Error bit extractor 704 extracts error detection data bits ("EDBs") 706 from the data bits and collects them to reconstruct an error detection code 708. Unlike diagram 400 of FIG. 4, receiver 700 does not use a PHY line decoder as does receiver 440. As such, receiver 700 need not recover a clock signal from an embedded clock. As shown, receiver 700 is configured to receive an external clock 701 from, for example, a transmitting device (not shown). It is the transmitting device that, for example, appends error detection bits to application data bits prior to transmission over link 702. Receiver 700 includes an error detector 780 for computing an error detection code, or in this case, a CRC checksum 722 based on a group of application data bits in FIFO 720. A comparator 724 (e.g., in error detector 720) then determines whether a transmission error has occurred. If an error exists, then an error corrector 780 can take corrective action by, for example, either requesting the transmitting device to retransmit the data bits or signaling application-specific logic that it is to correct the error.

Figure 8:
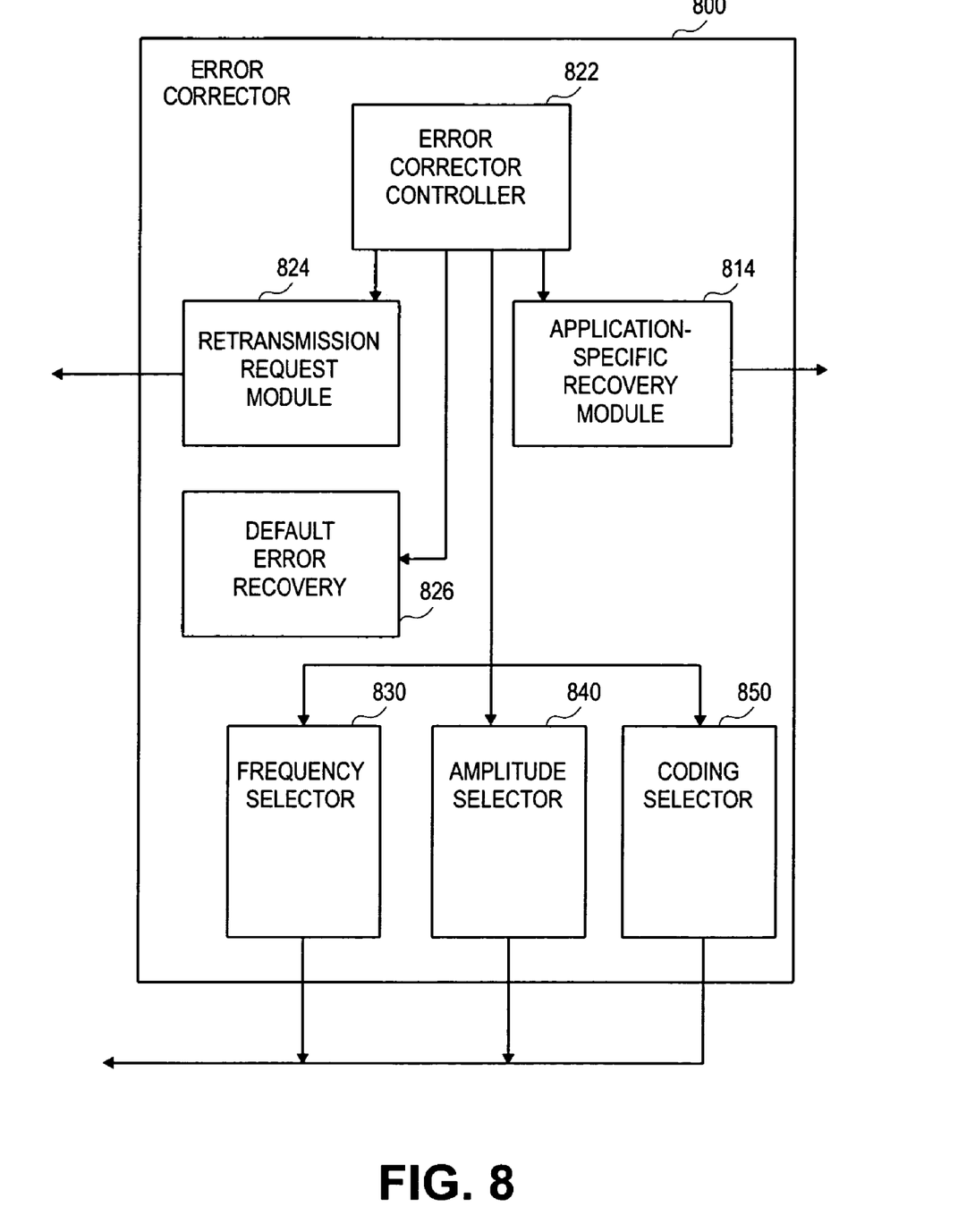
FIG. 8 depicts a block diagram of an error corrector according to one embodiment of the present invention.

FIG. 8 depicts a block diagram of an error corrector according to one embodiment of the invention. Error corrector 800 in this example includes an error corrector controller 822 to control one or more functions that can resolve errors, with the specific functions being programmed by a user for specific applications. For example, loss of pixel data in video memory application is not as crucial as the loss of data in other applications. As such, error corrector controller 822 can select any of the following modules to implement error correction. Retransmission request module 824 generates a request bound for the transmitting physical interface to resend the data bits upon detection of an error. Application-specific recovery module 814 signals an application-specific circuit to initiate its custom error-handling routines, as prescribed by a designer. But error corrector controller 822 can select a default error recovery scheme, such as reinitializing an IC upon detection of an error. This will cause both physical interfaces to reinitialize to a known state. In various alternative embodiments, error corrector 800 can include a frequency selector 830, an amplitude selector 840, and a coding selector 850. If signals on the communication link between the physical interfaces falter, then frequency selector 830 can adjust the data transfer rate over the link to reduce the error rate. Or, amplitude selector 840 can adjust the signal amplitude until the error rate is curtailed. Coding selector 850 can be used to change the line coding, for example, from 18B/20B to 8B/10B to reduce the time during which errors are detected. For example, consider a CRC of 32-bits is implemented for error recovery, with one bit of the CRC being sent at a time. With 18B/20B, it takes 576 application data bits (8 bits) to form a CRC of 32 bits (i.e., 8*32=576 bits), whereas with 8B/10B it takes 256 application data bits. As such, coding selector 850 can increase the rate at which errors codes (e.g., CRCs) are transmitted over a communications channel. Error corrector controller 822 can chose these selectors individually or in combination.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the invention to any embodiment; rather features and aspects of one embodiment may readily be interchanged with other embodiments. For example, although the above descriptions of the various embodiments relate to physical layer line decoders, the discussion is applicable to physical layer line encoders and all types of communications links, as well as many types of communications protocols, such as Gigabit Ethernet, HDMI, TMDS, DVI and SATA. Also, the various embodiments are applicable to point-to-point communications between electronic devices as well as broadcasting from one to many. While some of the above discussions relate to serial data communication, the various embodiments of the invention can apply to parallel data communications as well.

Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the invention; rather any specific embodiment can provide one or more of the advantages discussed above. It is intended that the following claims and their equivalents define the scope of the invention.

The invention claimed is:

1. An apparatus for detecting errors in a physical interface that facilitates data communications between integrated circuits ("ICs"), the apparatus comprising:
    a decoder configured to decode a subset of encoded data bits to yield decoded data bits, the subset including less than all of the encoded data bits;
    a physical interface ("PI") error detection bit extractor configured to extract a physical interface error detection bit from the decoded data bits, the physical interface error detection bit being used to determine whether the encoded data bits include at least one erroneous data bit as an error; and
    an error detector and an error corrector configured to operate within a physical layer, the error detector and error corrector, upon utilizing the physical interface error detection to detect the error within the encoded data bits, to correct the error;
    wherein the encoded data bits include an embedded asynchronous clock, the asynchronous clock to be utilized to provide clocking for the encoded data bits upon decoding; and
    wherein the subset of the encoded data bits includes N+m data bits and the decoded data bits include N application data bits, where m represents the number of extra bits used for at least embedding the asynchronous clock and the physical interface error detection bit in the encoded data bits.

2. The apparatus of claim 1 wherein the error detector performs error detection at a point that is earlier than at a data link layer or at any upper layer of the Open Systems Interconnection ("OSI") seven layer reference model above the physical layer.

3. The apparatus of claim 1 wherein the physical interface error detection bit is a parity bit, the error detector being configured to check a parity of the encoded data bits and to detect an error if the parity is noncompliant.

4. The apparatus of claim 1 wherein the physical interface error detection bit is a portion of an error-detection code.

5. The apparatus of claim 4 wherein the error-detection code is a cyclic redundancy check ("CRC") checksum, the error detector being configured to accumulate the physical interface error detection bit and other physical interface error detection bits from other subsets of the encoded data bits to reconstruct the error-detection code.

6. The apparatus of claim 5 wherein the error detector is configured to:
generate the CRC checksum from the physical interface error detection bit and the other physical interface error detection bits, and is configured further to:
compare the CRC checksum against the error-detection code to determine whether at least one error has occurred.

7. The apparatus of claim 5 wherein the physical interface error detection bit and each of the other physical interface error detection bits are received at the apparatus concurrently with the subset of the encoded data bits and each of the other subsets of the encoded data bits, respectively, thereby decreasing the time the apparatus receives the error-detection code that otherwise is appended to follow the encoded data bits.

8. The apparatus of claim 1 wherein the error corrector is configured either to request a retransmission of the subset of the encoded data bits or to signal an application-specific module of the detection of the error so that the application-specific module can resolve the error.

9. The apparatus of claim 1 wherein the apparatus is configured to receive the encoded data bits as N+2 data bits into one or more input terminals and to provide N application data bits and at least one physical interface error detection bit at one or more output terminals.

10. The apparatus of claim 9 wherein N is 8 and the apparatus is configured as an 8B/10B decoder that provides the physical interface error detection bit for error detection.

11. A method for decoding data bits to at least detect errors at a physical interface, the method comprising:
decoding a subset of an encoded bit stream having an embedded asynchronous clock to yield decoded data bits, the subset including less than all of the encoded data bits, the asynchronous clock to be utilized to provide clocking for the encoded data bits upon decoding;
extracting a physical interface error detection bit from the decoded data bits;
determining within a physical layer that the encoded bit stream includes at least one incorrect bit as an error based on the physical interface error detection bit; and
correcting the error at the physical interface;
wherein determining that the subset of the bit stream includes the incorrect bit comprises:
combining the physical interface error detection bit with other physical interface error detection bits to form a first error detection code,
generating a second error detection code based on application data bits from the decoded data bits and other application data bits from other decoded data bits decoded from other subsets of the bit stream,
comparing the first error detection code against the second error detection code, and
determining that the error is present if the second error detection code does not match the first error detection code.

12. The method of claim 11 wherein determining the subset of the encoded bit stream includes the incorrect bit further comprises:
determining a parity of a subset of the encoded bit stream with the physical interface error detection bit; and
determining that the error is present if the parity does not comply with a predetermined parity.

13. The method of claim 11 wherein correcting the error comprises requesting a retransmission of at least the subset of the encoded bit stream.

14. The method of claim 11 further comprising:
passing the decoded data bits to a framer for assembly into a frame if no error is detected based on the physical interface error detection bit;
extracting a contiguous set of bits constituting a Frame Check Sequence ("FCS") code for the frame;
computing a Cyclic Redundancy Check ("CRC") checksum; and
comparing the FCS code with the CRC checksum to determine whether another error exists.

* * * * *